United States Patent [19]

Roberts et al.

[11] Patent Number: 4,982,755
[45] Date of Patent: Jan. 8, 1991

[54] FLUX DENSITY CONTROL SYSTEM

[75] Inventors: Alfred A. Moran, Alan S. Roberts, Poimte Claire, Raymond J. Chartrand, Kirkland, John Gileta; both at Chateauguay, all of Canada

[73] Assignee: Electrovert, Ltd., Lapraire, Canada

[21] Appl. No.: 513,998

[22] Filed: Apr. 26, 1990

[51] Int. Cl.$^5$ .............................................. G05D 11/06
[52] U.S. Cl. ........................................... 137/3; 137/91
[58] Field of Search ....................................... 137/3, 91

[56] References Cited

U.S. PATENT DOCUMENTS 3,195,551  7/1965  Russell .............................. 137/91 X
3,485,257 12/1969  Gegenheimer ........................ 137/91
3,557,817  1/1971  Royse .................................... 137/91

Primary Examiner—Robert G. Nilson
Attorney, Agent, or Firm—Darby & Darby

[57] ABSTRACT

A flux density control system controls the density of flux or other liquid by measuring the density and adding a thinner solvent or other liquid with a lower density than the flux. The apparatus includes a tank having an overflow adapted to maintain a set level of liquid in the tank, a liquid container positioned to receive liquid from the overflow in the tank, and a liquid pump adapted to pump liquid from the liquid container to the tank. A thinner container is provided with a thinner pump adapted to pump thinner from the thinner container to the tank. A density probe is positioned in the tank with a controller to turn off the liquid pump when the density of liquid in the tank rises above a predetermined set point, and turn on the thinner pump. The controller also turns off the thinner pump and turns on the liquid pump when the density of liquid in the tank drops below the predetermined set point.

11 Claims, 2 Drawing Sheets

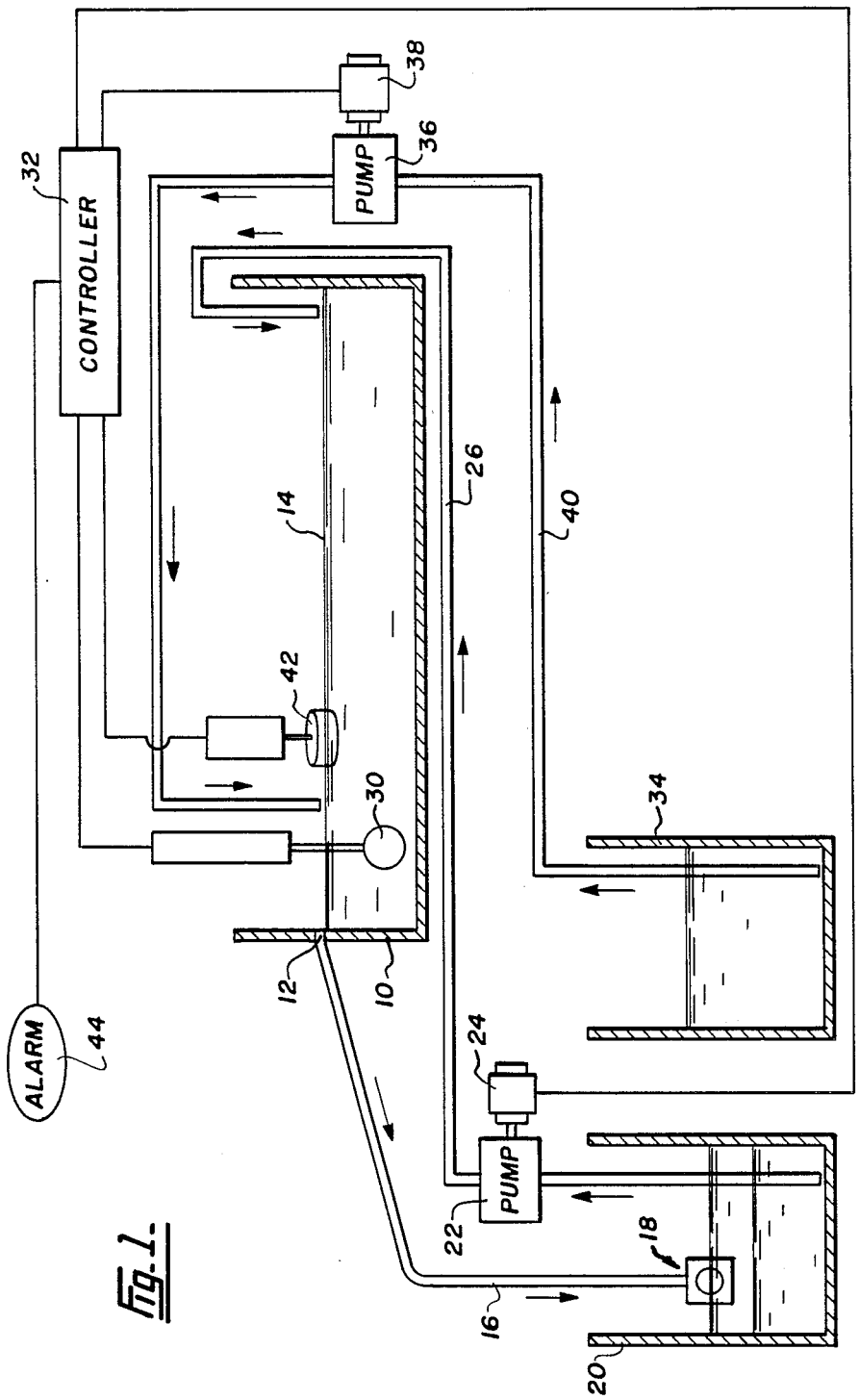

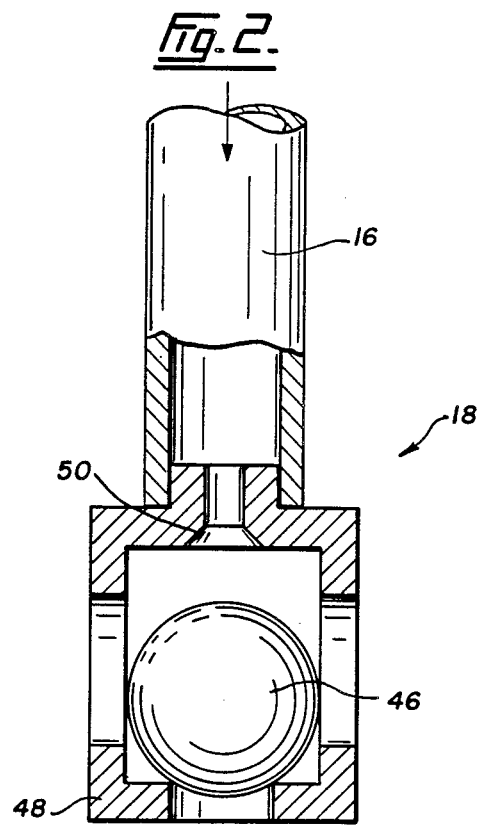

FLUX DENSITY CONTROL SYSTEM

FIELD OF THE INVENTION

The present invention relates to a system wherein the density of a liquid in a tank is controlled by application of a thinner liquid. More specifically, the present invention relates to a system of controlling the density of a flux in a tank by the addition of thinner.

REVIEW OF THE PRIOR ART

Elements such as surface mounted devices on printed wiring boards and the like are generally fluxed prior to soldering to allow solder to adhere to pins and solder surfaces. Flux is applied to printed wiring boards and other elements by a number of different ways including dipping, spraying and in one embodiment, foaming. This latter method is disclosed in U.S. Pat. No. 4,796,558. In this case a foam fluxer provides an arrangement wherein flux in a tank is foamed up in an aerated chimney having at least one vertical internal divider.

In nearly all cases, flux is placed in a tank, the flux level in the tank is controlled, as well as the density of the flux. Density measurement is one method of measuring and controlling the concentration of active flux ingredients in the solvent (thinner) carrier. This control is important to the soldering process.

One system that is provided for fluxing is the application of a density probe placed within a flux tank. The density probe measures the density, of the flux and if it is above a predetermined density then a thinner solvent is added to the flux tank. If it is below the predetermined density then more flux is added. However, this system only works within a narrow range of liquid level within the tank as determined by a float switch. Once the flux reaches the high limit level in the tank, then neither more flux nor thinner can be added and thus the density of the flux cannot be changed until the liquid level drops. When the level drops down to a low limit then it is possible to add either more flux or more thinner, depending upon the density reading.

Throughout the text reference is made to "liquid" and "thinner" in the case of flux, then flux is the liquid and the thinner is a solvent having a low density added to reduce the density of the mixture. In the case of other liquids, thinner is a liquid having a lower density to the liquid in the liquid container.

DEFINITION OF THE INVENTION

It is an aim of the present invention to provide an arrangement wherein the density in a liquid tank can be controlled at all times by incorporating an overflow from the tank for liquid to continuously flow back into a main liquid container. A pump is provided from the container to pump the liquid back to the tank. Thus a circulation continues and the level in the tank remains substantially the same as it continuously overflows from the tank back into the liquid container. Furthermore a thinner tank is provided with a pump so that thinner can be pumped into the tank. A density probe is located in the tank to provide an indication of density. If the density is too high, then the pump from the liquid container is turned off and the pump from the thinner container is turned on. Thus thinner is pumped into the tank to reduce the density.

The system is particularly applicable to flux control which generally requires the addition of thinner to reduce the density of the flux. The system utilises a simple economical method of controlling flux density without having to resort to a sophisticated and expensive arrangement.

The present invention provides an apparatus for controlling liquid density in a tank comprising a tank having an overflow adapted to maintain a set level of liquid in the tank, a liquid container positioned to receive liquid from the overflow in the tank, a liquid pump adapted to pump liquid from the liquid container to the tank, a thinner container, a thinner pump adapted to pump thinner from the thinner container to the tank, a density probe in the tank, and means to turn off the liquid pump when the density of liquid in the tank rises above a predetermined set point, and turn on the thinner pump, and means to turn off the thinner pump and turn on the liquid pump when the density of liquid in the tank drops below the predetermined set point.

The present invention also provides in a method of controlling density in a liquid tank, wherein a liquid and a thinner are added individually to the tank from a liquid container and a thinner container, the improvement comprising the steps of pumping liquid from the liquid container to the tank, overflowing liquid from the tank and returning the overflowing liquid to the liquid container, measuring density of liquid in the tank and if the density increases beyond a present level, cease pumping liquid from the liquid container to the tank, and commence pumping thinner from the the thinner container to the tank, when the density of the liquid in the tank returns to the present level, cease pumping thinner from the thinner container and commence pumping liquid from the liquid container to the tank.

DESCRIPTION OF THE DRAWINGS

In drawings which illustrate embodiments of the invention,

FIG. 1 is a schematic drawing showing an arrangement according to one embodiment of the present invention wherein a tank has a liquid density control therein.

FIG. 2 is a sectional view of a suitable ball float valve in the overflow line to the liquid container according to a preferred embodiment of the invention.

DESCRIPTION OF THE PREFERRED EMBODIMENTS

FIG. 1 illustrates a density control arrangement for a tank which is suitable for a tank containing flux to be used in fluxing elements prior to soldering. The method of application of the flux to the elements is not illustrated but is well known in the art. A spray or a curtain for fluxing the elements may be provided or the elements may be dipped in the tank. In another embodiment a foam applicator is used to provide a foamed flux through which the elements to be soldered are conveyed.

The flux tank 10 has an overflow 12 positioned at one side of the tank 10 to control the level 14 of liquid flux within the tank. The overflow 12 connects with a discharge line 16 terminating in a float valve 18 within a flux container 20. A flux pump 22, driven by motor 24, draws flux up from the flux container 20 and passes it through a flux line 26 which discharges the flux at the other side of the tank 10 to the overflow 12. Under normal conditions the pump 22 is continuously running and flux is continuously pumped into the tank 10 and overflows through the discharge line 16 back into the container 20. Thus the overflow 12 maintains a constant level 14 of flux within the tank 10. A density probe 30 is placed in the tank 10 and provides an indication of density which is fed to a controller 32. A thinner tank 34 contains thinner, that is a liquid with a lower density than the flux. A thinner pump 36, driven by a motor 38, pumps thinner from the tank 34 through a thinner line 40 and discharges the thinner into the tank 10 adjacent the density probe 30. The density probe 30 is preferably located at a position close to the overflow 12. A float switch 42 is provided which is set at a level above the overflow 12. Thus if the flux level 14, within the tank 10 rises above the overflow 12 then the float switch 42 provides a signal to the controller to turn off the pumps 22 and 36.

At the commencement of operation, the flux container 20 is filled with flux at the desired density, the thinner container 34 is filled and the flux tank is empty. The system is turned on. The density probe 30 being in air shows a low density thus the flux pump 22 is turned on by the controller 32 and pumps flux to fill up the tank 10 until it reaches the overflow 12 and continues pumping thus causing flux to overflow back into the flux container 20. The flux container has sufficient capacity so that when the tank 10 is full and overflowing there is still sufficient quantity of flux in the container for recirculating and ensuring that the tank 10 remains full. In one embodiment the flux container 20 has a capacity of at least five gallons.

The flux pump 22 continues to operate, the flux level 14 remains constant and flux overflows through the discharge line 16 back into the flux container 20. As the flux is used up by the application of flux to the elements to be soldered, more flux is taken from the container 20 and the level of flux in the container 20 falls. If the density of the flux increases due to evaporation and heat when applied to the elements to be soldered, then the density probe 30 determines when the density reaches a predetermined set point and through the controller 32 shuts off the flux pump 22 and turns on the thinner pump 36. The density set point can be determined for different fluxes and the controller permits this set point to be adjusted for different levels. Thinner is now pumped from the thinner container 34 into the tank 10 and is deposited adjacent the density probe 30. Thus the density probe 30 senses the rapid decrease in density and switches back to the flux pump 22 once the density has dropped below the set point. The recirculating flux being deposited at the far end of the tank 10 ensures that flux flows through the tank to the overflow 12. The short charge of thinner may not be sufficient to bring all the flux to the correct density, and as mixing occurs the density level rises and the density probe 30 switches off the flux pump 22 and switches on the thinner pump 36. This process continues until the density of the flux has stabilized. By locating the thinner inlet close to the density probe 30, a small quantity of thinner only is added to the tank 10 at one time and thus avoids a large volume of thinner being added to the tank and over shooting the density set point.

The addition of thinner to the flux does not cause the flux container 20 to overflow as it has been approximately 80% emptied by the initial loading of flux into the flux tank 10. If for any reason the overflow 12 becomes plugged then the flux level 14 rises in the tank 10 and the float switch 42 turns off both pumps 22 and 36 and at the same time sounds an alarm 44 which may be a sound alarm or a light alarm.

A snorkel type ball float valve 18 is shown in more detail in FIG. 2. The float valve 18 is positioned at the end of the discharge line 16 in the flux container 20 positioned at the highest liquid level permissible in the container 20. The valve 18 contains a ball 46 within a cage 48. When the liquid level rises the ball 46 floats up and fits into a seat 50 which seals the discharge line 16, thus no further flux can pass through the discharge line 16. When this occurs, the liquid level 14 in the tank 10 rises and the float switch 42 is triggered to turn off the pumps 22 and 36.

Whereas the disclosure describes a flux tank it will be apparent that the arrangement may be used for other liquids, one being a liquid of specific density which due to evaporation or other reasons has a density increase or density decrease, and a second container containing a liquid of a lower density which can be added to control the density of liquid in the tank 10 to a predetermined amount.

Various changes may be made to the embodiments shown herein without departing from the scope of the present invention which is limited only by the following claims.

The embodiments of the present invention in which an exclusive property or privilege is claimed are defined as follows:

1. An apparatus for controlling liquid density in a tank comprising:
   a tank having an overflow adapted to maintain a set level of liquid in the tank,
   a liquid container positioned to receive liquid from the overflow in the tank,
   a liquid pump adapted to pump liquid from the liquid container to the tank,
   a thinner container,
   a thinner pump adapted to pump thinner from the thinner container to the tank,
   density probe in the tank, and
   means to turn off the liquid pump when the density of liquid in the tank rises above a predetermined set point, and turn on the thinner pump, and means to turn off the thinner pump and turn on the liquid pump when the density of liquid in the tank drops below the predetermined set point.

2. The apparatus for controlling liquid density in the tank according to claim 1 wherein the liquid is a flux.

3. The apparatus for controlling liquid density in a tank according to claim 1 including a float switch in the tank adapted to turn off the liquid pump and the thinner pump when the level in the tank rises above the set level.

4. The apparatus for controlling liquid density in a tank according to claim 1 wherein the liquid pump pumps liquid to a position in the tank on the opposite side of the overflow.

5. The apparatus for controlling liquid density in a tank according to claim 4 wherin the thinner pump pumps thinner to a position in a tank adjacent the density probe.

6. The apparatus for controlling liquid in a tank according to claim 3 including an overflow line from the overflow to the liquid container, the overflow line terminating in a float valve in the liquid container, the float valve adapted to close the overflow line if the liquid level in the liquid container exceeds a predetermined level.

7. The apparatus for controlling liquid density in a tank according to claim 6 wherein the float valve is a snorkel type ball float valve.

8. In a method of controlling density in a liquid tank wherein a liquid and a thinner are added individually to the tank from a liquid container and a thinner container, the improvement comprising the steps of, pumping liquid from the liquid container to the liquid tank, overflowing liquid from the tank and returning the overflowing liquid to the liquid container, and measuring density of liquid in the tank and if the density increases beyond a preset level, cease pumping liquid from the liquid container to the tank, and commence pumping thinner from the thinner container to the tank, when the density of the liquid in the tank returns to the preset level, cease pumping thinner from the thinner container and commence pumping from the liquid container to the liquid tank.

9. The method of controlling density in a liquid tank according to claim 8 wherein the liquid from the liquid container is pumped in at one side of the tank and the overflowing liquid overflows at the other side of the tank.

10. The method of controlling density in a liquid tank according to claim 9 wherein the thinner is pumped into the tank at a location adjacent the position where the density of the liquid in the tank is measured.

11. The method of controlling density in a liquid tank according to claim 8 including the step of preventing liquid overflowing to the liquid container when the liquid container is full, and permitting liquid level in the tank to reach a level where an electric float switch means stops pumping liquid and thinner into the tank.

* * * * *

UNITED STATES PATENT AND TRADEMARK OFFICE
CERTIFICATE OF CORRECTION

PATENT NO. : 4,982,755

DATED : January 8, 1991

INVENTOR(S) : Alan S. Roberts et al

It is certified that error appears in the above-identified patent and that said Letters Patent is hereby corrected as shown below:

On the title page, delete everything after "Inventors:" and before "[73] Assignee:" and substitute therefor:

--Alan S. Roberts, Point Claire; Raymond J. Chartrand, Kirkland; John Gileta, Alfred A. Moran, both at Chateauguay, all of Cananda--.

Signed and Sealed this

Fourteenth Day of July, 1992

*Attest:*

DOUGLAS B. COMER

*Attesting Officer*     *Acting Commissioner of Patents and Trademarks*